United States Patent
Huang et al.

(10) Patent No.: US 11,736,998 B2
(45) Date of Patent: Aug. 22, 2023

(54) METHOD FOR PREVENTING AN INTER-RAT CHANGE FROM BEING TRIGGERED AND COMMUNICATIONS APPARATUS UTILIZING THE SAME

(71) Applicant: MEDIATEK INC., Hsinchu (TW)

(72) Inventors: Guan-Jie Huang, Hsinchu (TW); Tzu-Wen Chang, Hsinchu (TW); Kuan-Wei Chen, Hsinchu (TW); Yu-Hua Huang, Hsinchu (TW); Teng Ma, Shanghai (CN); Sheng-Kai Chang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 46 days.

(21) Appl. No.: 17/466,044

(22) Filed: Sep. 3, 2021

(65) Prior Publication Data
US 2021/0400550 A1    Dec. 23, 2021

Related U.S. Application Data

(63) Continuation of application No. 16/513,884, filed on Jul. 17, 2019, now Pat. No. 11,140,593.
(Continued)

(30) Foreign Application Priority Data

Apr. 28, 2019    (CN) .......................... 201910347470.8

(51) Int. Cl.
*H04W 36/00*    (2009.01)
*H04W 8/08*    (2009.01)
(Continued)

(52) U.S. Cl.
CPC ....... *H04W 36/00837* (2018.08); *H04W 8/08* (2013.01); *H04W 36/0079* (2018.08);
(Continued)

(58) Field of Classification Search
CPC ............ H04W 88/12; H04W 36/0022; H04W 36/00837; H04W 8/08; H04W 36/0079; H04W 36/14; H04W 36/24; H04W 76/19
See application file for complete search history.

(56) References Cited

U.S. PATENT DOCUMENTS 9,326,199 B2    4/2016    Chen et al.
2003/0109216 A1    6/2003    Kim et al.
(Continued)

*Primary Examiner* — Raj Jain
(74) *Attorney, Agent, or Firm* — McClure, Qualey & Rodack, LLP

(57) ABSTRACT

A communications apparatus and associated method communicating with at least one cellular network includes a radio transceiver and a processor. The communications apparatus includes a radio transceiver, capable of transmitting or receiving wireless radio frequency signals to or from a cellular network; and a processor. The processor is configured to: receive an incoming call request message that will trigger a Circuit Switch Fall Back (CSFB) procedure or a Evolved Packet System Fall Back (EPS FB) procedure from the cellular network via the radio transceiver, query a user to accept or reject the incoming call request before triggering the CSFB procedure or the EPS FB procedure,
(Continued)

and determine whether to trigger the CSFB procedure or the EPS FB procedure based on a response to the query from the user.

20 Claims, 11 Drawing Sheets

Related U.S. Application Data

(60) Provisional application No. 62/735,922, filed on Sep. 25, 2018.

(51) Int. Cl.
    *H04W 76/19*     (2018.01)
    *H04W 76/27*     (2018.01)
    *H04W 68/00*     (2009.01)
    *H04W 36/14*     (2009.01)
    *H04W 36/24*     (2009.01)

(52) U.S. Cl.
    CPC ............ *H04W 36/14* (2013.01); *H04W 36/24* (2013.01); *H04W 68/005* (2013.01); *H04W 76/19* (2018.02); *H04W 76/27* (2018.02)

(56) References Cited

U.S. PATENT DOCUMENTS

| | | | |
|---|---|---|---|
| 2010/0128608 A1 | 5/2010 | Zou et al. | |
| 2010/0273482 A1 | 10/2010 | Jain et al. | |
| 2010/0284333 A1* | 11/2010 | Shirota | H04W 36/0022 370/328 |
| 2012/0083278 A1 | 4/2012 | Kazmi et al. | |
| 2013/0309991 A1* | 11/2013 | Shaw | H04W 76/36 370/328 |
| 2013/0310036 A1 | 11/2013 | Molloy et al. | |
| 2014/0036866 A1 | 2/2014 | Seon et al. | |
| 2014/0112119 A1 | 4/2014 | Chen et al. | |
| 2014/0349662 A1* | 11/2014 | Ekici | H04W 76/16 455/450 |
| 2015/0024751 A1 | 1/2015 | Wong et al. | |
| 2017/0230317 A1 | 8/2017 | Van et al. | |
| 2018/0041923 A1* | 2/2018 | Wu | H04L 5/0055 |
| 2018/0295552 A1* | 10/2018 | Chakraborty | H04W 48/18 |
| 2020/0100153 A1* | 3/2020 | Huang | H04W 36/0079 |
| 2021/0400550 A1* | 12/2021 | Huang | H04W 36/14 |

* cited by examiner

METHOD FOR PREVENTING AN INTER-RAT CHANGE FROM BEING TRIGGERED AND COMMUNICATIONS APPARATUS UTILIZING THE SAME

CROSS REFERENCE TO RELATED APPLICATIONS

This application is a continuation of U.S. application Ser. No. 16/513,884 filed on Jul. 17, 2019, now U.S. Pat. No. 11,140,593, which claims the benefit of U.S. Provisional Application No. 62/735,922 filed on Sep. 25, 2018, and also claims priority of China Patent Application No. 201910347470.8, filed on Apr. 28, 2019, the entirety of which is incorporated by reference herein.

BACKGROUND OF THE INVENTION

Field of the Invention

The invention relates to method for preventing an inter-RAT change from being triggered, so as to avoid unwanted disconnection.

Description of the Related Art

The term "wireless" normally refers to an electrical or electronic operation, which is accomplished without the use of a "hard wired" connection. "Wireless communications" is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party from many locations worldwide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly used communications system, which uses time division multiple access (TDMA) technology, which is a multiplex access scheme for digital radio, to send voice, data, and signaling data (such as a dialed telephone number) between mobile phones and cell sites. The CDMA2000 is a hybrid mobile communications 21.5G/3G (generation) technology standard that uses code division multiple access (CDMA) technology. The UMTS (Universal Mobile Telecommunications System) is a 3G mobile communications system, which provides an enhanced range of multimedia services over the GSM system. Wireless Fidelity (Wi-Fi) is a technology defined by the 802.11 engineering standard that can be used for home networks, mobile phones, and video games to provide a high-frequency wireless local area network. Long-Term Evolution (LTE) is a standard for wireless communication of high-speed data for mobile phones and data terminals. It is based on the GSM/EDGE and UMTS/HSPA network technologies, increasing the capacity and speed using a different radio interface together with core network improvements.

In order to provide more efficient communications services and improve user experience, methods for avoiding unwanted disconnection of a communications apparatus are provided.

BRIEF SUMMARY OF THE INVENTION

Communications apparatus and method for preventing an inter-RAT change from being triggered are provided. An exemplary embodiment of a communications apparatus communicating with at least one cellular network comprises a radio transceiver and a processor. The radio transceiver is capable of transmitting or receiving wireless radio frequency signals to or from an air interface in the cellular network. The processor is configured to determine whether an inter-RAT change will be triggered in a subsequent procedure when the communications apparatus is in a connected mode. When the processor determines that an inter-RAT change procedure will be triggered, the processor is configured to selectively perform a predetermined procedure instead of the subsequent procedure to avoid the inter-RAT change.

An exemplary embodiment of a method for preventing an inter-RAT change from being triggered when a communications apparatus is in a connected mode comprises: determining, by a processor of the communications apparatus, whether an inter-RAT change will be triggered in a subsequent procedure when the communications apparatus is in the connected mode; and when the inter-RAT change procedure is determined to be triggered in the subsequent procedure, selectively performing, by the processor, a predetermined procedure instead of the subsequent procedure to prevent the inter-RAT change from being triggered.

Another exemplary embodiment of a method for preventing an inter-RAT change from being triggered when a communications apparatus is in a connected mode comprises: determining, by a processor of the communications apparatus, whether the communications apparatus is in the connected mode; and when the communications apparatus is in the connected mode, selectively performing, by the processor, a predetermined procedure to prevent an inter-RAT change from being triggered.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
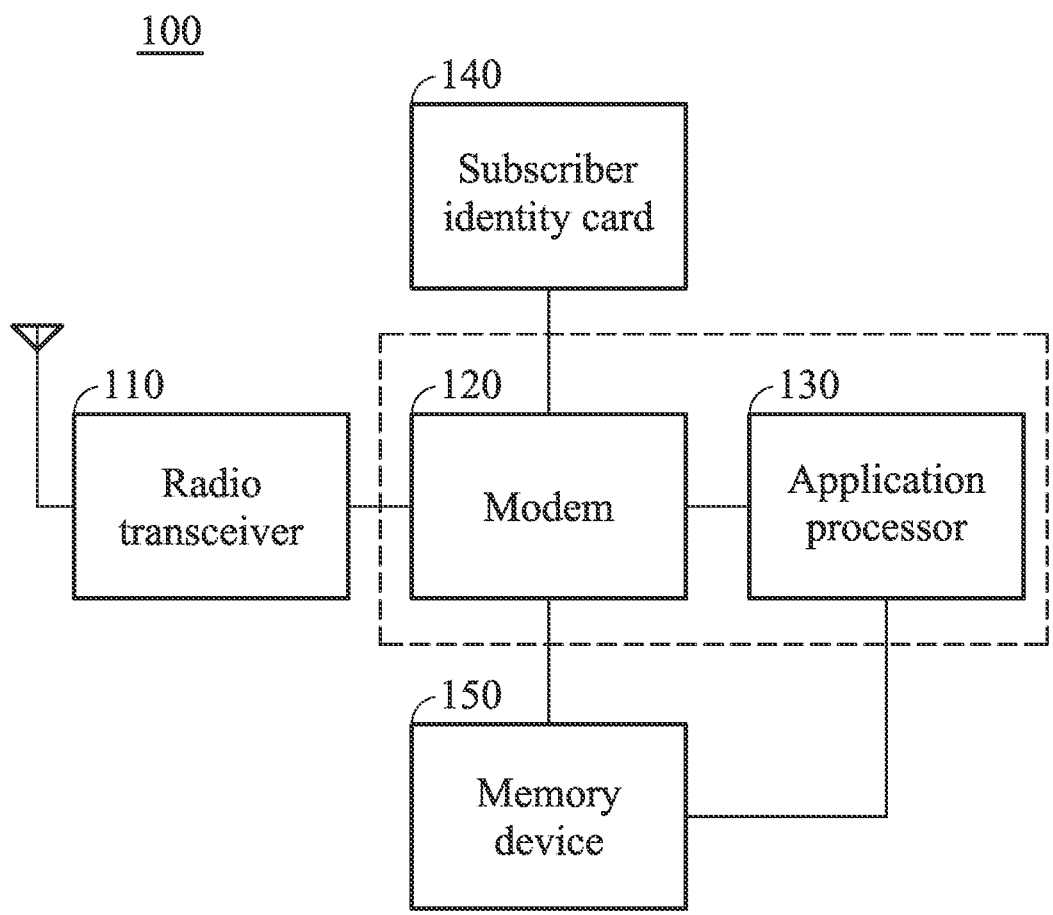
FIG. 1 shows an exemplary block diagram of a communications apparatus according to an embodiment of the invention.

FIG. 1 shows an exemplary block diagram of a communications apparatus according to an embodiment of the invention. The communications apparatus 100 may be a portable electronic device, such as a Mobile Station (MS, which may be interchangeably referred to as User Equipment (UE)). The communications apparatus 100 may comprise at least an antenna module comprising at least one antenna, a radio transceiver 110, a modem 120, an application processor 130, a subscriber identity card 140, and a memory device 150. The radio transceiver 110 may receive wireless radio frequency signals from an air interface via the antenna module, transmit wireless radio frequency signals to the air interface via the antenna module and perform RF signal processing. For example, the radio transceiver 110 may convert the received signals into intermediate frequency (IF) or baseband signals to be processed, or receive the IF or baseband signals from the modem 120 and convert the received signals into wireless radio frequency signals to be transmitted to a network device in a cellular network. According to an embodiment of the invention, the network device may be a cell, a node B, an evolved node B (eNB), a g node B (gNB) a base station, a Mobility Management Entity (MME) etc., at the network side of the cellular network and communicating with the communications apparatus 100 via the wireless radio frequency signals.

The radio transceiver 110 may comprise a plurality of hardware devices to perform radio frequency conversion and RF signal processing. For example, the radio transceiver 110 may comprise a power amplifier for amplifying the RF signals, a filter for filtering unwanted portions of the RF signals and/or a mixer for performing radio frequency conversion. According to an embodiment of the invention, the radio frequency may be, for example, 900 MHz or 1800 MHz for a Global System for Mobile communication (GSM), or 1900 MHz for a Universal Mobile Telecommunications System (UMTS), or the frequency of any specific frequency band for a CDMA 2000 system, or the frequency of any specific frequency band for a Long-Term Evolution (LTE) system, or the frequency of any specific frequency band for a 5G new radio (NR) system, etc.

The modem 120 may be a cellular communications modem configured to handle cellular system communications protocol operations and processing the IF or baseband signals received from or to be transmitted to the radio transceiver 110. The application processor 130 is configured to run the operating system of the communications apparatus 100 and run application programs installed in the communications apparatus 100. In the embodiments of the invention, the modem 120 and the application processor 130 may be designed as discrete chips with some buses or hardware interfaces coupled therebetween, or they may be integrated into a combo chip (i.e., a system on chip (SoC)), and the invention should not be limited thereto.

The subscriber identity card 140 may be a SIM, USIM, R-UIM or CSIM card, or the like and may typically contain user account information, an International Mobile Subscriber Identity (IMSI) and a set of SIM application toolkit (SAT) commands and may provide storage space for phone book contacts. The memory device 150 may be coupled to the modem 120 and application processor 130 and may store system data or user data.

It should be noted that, in order to clarify the concept of the invention, FIG. 1 presents a simplified block diagram in which only the elements relevant to the invention are shown. For example, in some embodiments of the invention, the communications apparatus may further comprise some peripheral devices not shown in FIG. 1. In another example, in some embodiments of the invention, the communications apparatus may further comprise a central controller coupled to the modem 120 and the application processor 130. Therefore, the invention should not be limited to what is shown in FIG. 1.

In some embodiments of the invention, the communications apparatus is capable of supporting multiple radio access technologies (RATs) communications via the single-card structure as shown in FIG. 1. It should be noted that, although FIG. 1 shows a single-card application, the invention should not be limited thereto. For example, in some embodiments of the invention, the communications apparatus may comprise multiple subscriber identity cards to support the multi-RATs communications, in either a single-standby or a multiple-standby manner. In the multi-RATs communications applications, the modem, the radio transceiver and/or the antenna module may be shared by the subscriber identity card(s) and may have the capability of handling the operations of different cellular systems and processing the corresponding RF, IF or baseband signals in compliance with the corresponding cellular system communications protocols.

In addition, those who are skilled in this technology can still make various alterations and modifications based on the descriptions given above to derive the communications apparatuses comprising multiple radio transceivers and/or multiple antenna modules for supporting multi-RAT wireless communications without departing from the scope and spirit of this invention. Therefore, in some embodiments of the invention, the communications apparatus may be designed to support a multi-card application, in either a single-standby or a multiple-standby manner, by making some alterations and modifications.

It should be further noted that the subscriber identity card 140 may be dedicated hardware cards as described above, or in some embodiments of the invention, there may be individual identifiers, numbers, addresses, or the like which are burned in the internal memory device of the corresponding modem and are capable of identifying the communications apparatus. Therefore, the invention should not be limited to what is shown in the figures.

It should be further noted that in some embodiments of the invention, the communications apparatus may further support multiple IMSIs.

Figure 2:
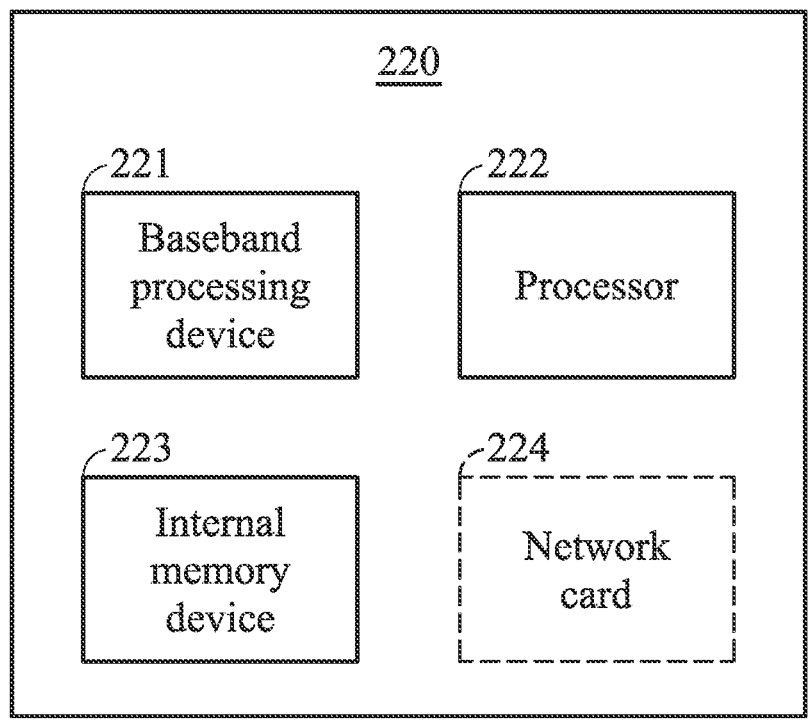
FIG. 2 shows an exemplary block diagram of a modem according to an embodiment of the invention.

FIG. 2 shows an exemplary block diagram of a modem according to an embodiment of the invention. The modem 220 may be the modem 120 shown in FIG. 1 and may comprise at least a baseband processing device 221, a processor 222, an internal memory device 223 and a network card 224. The baseband processing device 221 may receive the IF or baseband signals from the radio transceiver 110 and perform IF or baseband signal processing. For example, the baseband processing device 221 may convert the IF or baseband signals into a plurality of digital signals, and process the digital signals, and vice versa. The baseband processing device 221 may comprise a plurality of hardware devices to perform signal processing, such as an analog-to-digital converter for ADC conversion, a digital-to-analog converter for DAC conversion, an amplifier for gain adjustment, a modulator for signal modulation, a demodulator for signal demodulation, an encoder for signal encoding, a decoder for signal decoding, and so on.

According to an embodiment of the invention, the baseband processing device 221 may be designed to have the capability of handling the baseband signal processing operations of different cellular systems and processing the corresponding IF or baseband signals in compliance with the corresponding cellular system communications protocols, so as to support the multi-RAT wireless communications. According to another embodiment of the invention, the baseband processing device 221 may comprise a plurality of sub-units, each being designed to have the capability of handling the baseband signal processing operations of one or more specific cellular systems and processing the corresponding IF or baseband signals in compliance with the corresponding cellular system communications protocols, so as to support the multi-RAT wireless communications. Therefore, the invention should not be limited to any specific way of implementation.

The processor 222 may control the operations of the modem 220. According to an embodiment of the invention, the processor 222 may be arranged to execute the program codes of the corresponding software module of the modem 220. The processor 222 may maintain and execute the individual tasks, threads, and/or protocol stacks for different software modules. In a preferred embodiment, a protocol stack may be implemented so as to respectively handle the radio activities of one RAT. However, it is also possible to implement more than one protocol stack to handle the radio activities of one RAT at the same time, or implement only one protocol stack to handle the radio activities of more than one RAT at the same time, and the invention should not be limited thereto.

The processor 222 may also read data from the subscriber identity card coupled to the modem, such as the subscriber identity card 140, and write data to the subscriber identity card. The internal memory device 223 may store system data and user data for the modem 220. The processor 222 may also access the internal memory device 223.

The network card 224 provides Internet access services for the communications apparatus. It should be noted that, although the network card 224 shown in FIG. 2 is configured inside of the modem, the invention should not be limited thereto. In some embodiments of the invention, the communications apparatus may also comprise a network card configured outside of the modem, or the communications apparatus may also be coupled to an external network card for providing Internet access services. In some embodiments of the invention, the network card 224 may be a virtual network card, instead of a tangible card, that is created by the operating system of the communications apparatus 100. Therefore, the invention should not be limited to any specific implementation method.

It should be noted that, in order to clarify the concept of the invention, FIG. 2 presents simplified block diagrams in which only the elements relevant to the invention are shown. Therefore, the invention should not be limited to what is shown in FIG. 2.

It should be further noted that in some embodiments of the invention, the modem may also comprise more than one processor and/or more than one baseband processing device. For example, the modem may comprise multiple processors and/or multiple baseband processing devices for supporting multi-RAT operations. Therefore, the invention should not be limited to what is shown in FIG. 2.

It should be further noted that in some embodiments of the invention, the baseband processing device 221 and the processor 222 may be integrated into one processing unit, and the modem may comprise one or more multiple such processing units, for supporting multi-RAT operations. Therefore, the invention should not be limited to what is shown in FIG. 2.

Figure 3A:
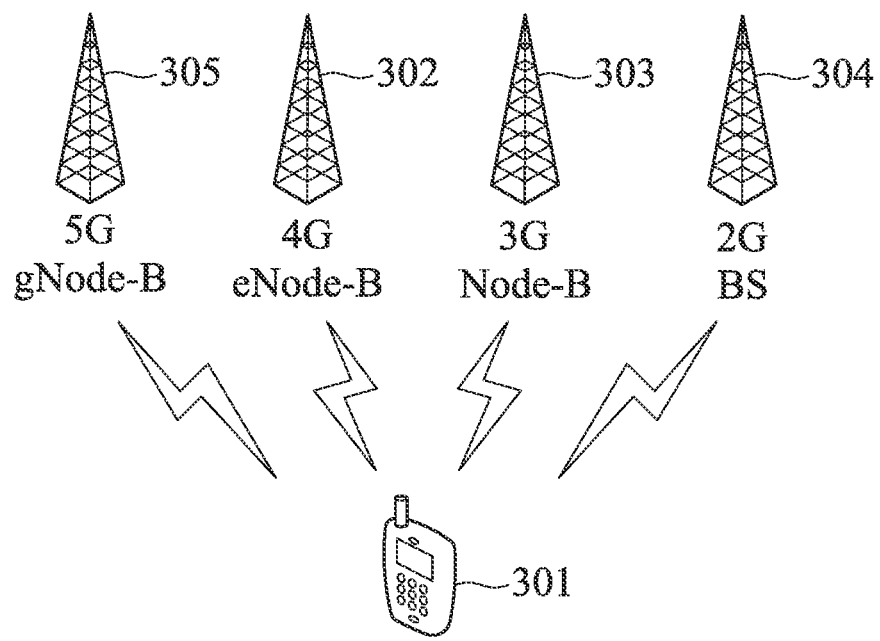
FIG. 3A shows an exemplary deployment of a cellular communications system according to an embodiment of the invention.

FIG. 3A shows an exemplary deployment of a cellular communications system according to an embodiment of the invention. The cellular communications system 300A is a 3GPP system supporting one or more wireless networks of one or more RATs, such a 5G system, a 4G/LTE system, a 3G system and a 2G system. The cellular communications system 300A has one or more fixed base infrastructure units, such as wireless communications stations 302, 303, 304 and 305, forming wireless networks distributed over a geographical region. The base unit may also be referred to as an access point, an access terminal, a base station, a Node-B, an eNode-B, a gNode-B or by other terminology used in the art, such as the eNode-B (eNB) (e.g. 302) of the 4G/LTE system, the Node-B (e.g. 303) of the 3G system, the base station (BS) (e.g. 304) of the 2G system, and the gNode-B (gNB) (e.g. 305) of the 5G system, as shown. Each of the wireless communications stations 302, 303, 304 and 305 serves a geographic area.

A communications apparatus/user equipment (UE) 301 in the cellular communications system 300A can be served by the eNB 302, the Node-B 303, the BS 304 and/or by the gNB 305. The communications apparatus 301 may be implemented as the communications apparatus 100 as shown in FIG. 1. The communications apparatus 301 may establish a bearer with the cellular communications system 300A. For example, the communications apparatus 301 may establish an EPS bearer in the 4G system via the SI interface, or establishes a PDP context in the 3G system via the Iu interface, establishes a PDP context in the 2G system via the Gb interface, or establish a new radio (NR) bearer in the 5G system.

Figure 3B:
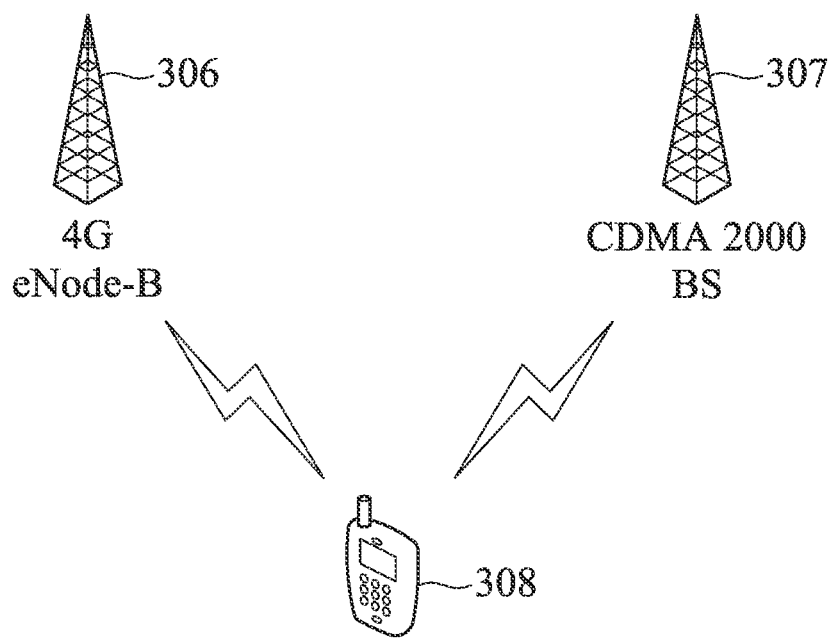
FIG. 3B shows another exemplary deployment of a cellular communications system according to another embodiment of the invention.

FIG. 3B shows another exemplary deployment of a cellular communications system according to another embodiment of the invention. The cellular communications system 300B is another system supporting one or more wireless networks of one or more RATs, such a 4G/LTE system and a CDMA 2000 system. The cellular communications system 300B has one or more fixed base infrastructure units, such as the wireless communications stations 306 and 307. The wireless communications stations 306 and 307 forming wireless networks distributed over a geographical region may be referred to as an access point, an access terminal, a base station, a Node-B, an eNode-B, or by other terminology used in the art, such as the eNode-B (eNB) (e.g. 306) of the 4G/LTE system and the base station (BS) (e.g. 307) of the CDMA 2000 system as shown. Each of the wireless communications stations 306 and 307 serves a geographic area.

A communications apparatus/user equipment (UE) 308 in the cellular communications system 300B can be served by the eNB 306 and by the BS 307. The communications apparatus 308 may be implemented as the communications apparatus 100 as shown in FIG. 1. The communications apparatus 308 may establish a bearer with the cellular communications system 300 B.

When a communications apparatus, such as the communications apparatus 100, 301 or 308, is served in a communications system that supports multiple RATs, the communications apparatus may need to perform RAT change (or inter-RAT change, inter-RAT bearer change) in some circumstance. However, the inter-RAT change usually causes unwanted disconnection, which impacts the user experience. The user experience will be exacerbated when the user is performing some specific operations that are quite important. For example, when the user is playing an online game, the user will find disconnection to be unacceptable.

In view of this, methods for preventing an inter-RAT change from being triggered by the communications apparatus, especially when the communications apparatus is in a connected mode, such as an Evolved Packet System (EPS) Mobility Management (EMM)-connected mode or a 5G Mobility Management (MM)-connected mode, are provided.

Figure 4A:
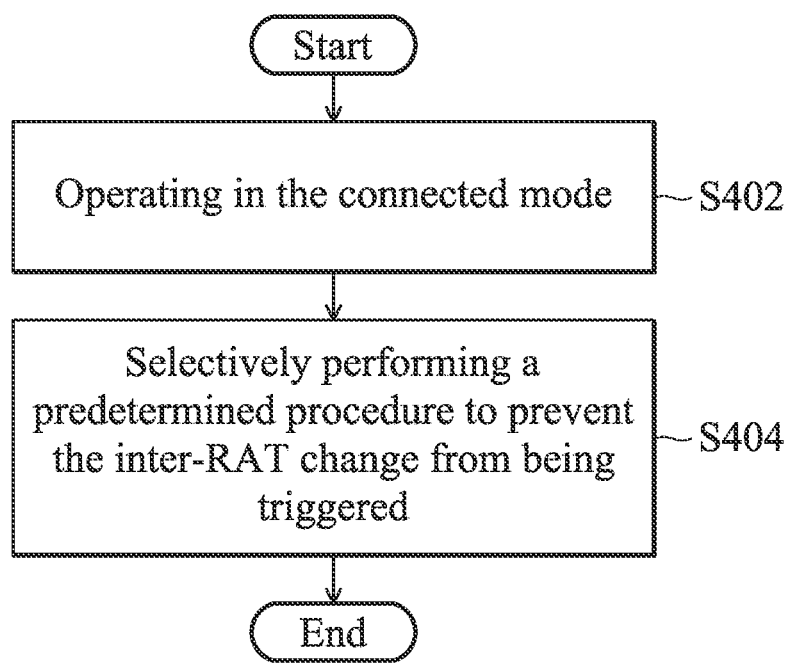
FIG. 4A is a flow chart of a method for preventing an inter-RAT change from being triggered when a communications apparatus is in a connected mode according to an embodiment of the invention.

FIG. 4A is a flow chart of a method for preventing an inter-RAT change from being triggered when a communications apparatus is in a connected mode according to an embodiment of the invention. The method may begin for the processor (e.g. the processor 222 in the modem 120/220 or the application processor 130) of the communications apparatus (e.g. the communications apparatus 100, 301 or 308) to determine whether the communications apparatus operates in the connected mode or in the connected state. When the processor determines that the communications apparatus is in the connected mode (connected state) (Step S402), the processor may selectively perform a predetermined procedure to prevent the inter-RAT change from being triggered (Step S404). In one example, when the processor determines that the communications apparatus is in the connected mode (connected state), the processor may directly perform a predetermined procedure to prevent the inter-RAT change from being triggered.

According to an embodiment of the invention, the connected mode (connected state) is the EMM connected mode (EMM connected state). When an RRC connection between the communications apparatus and a network device, such as the MME, has been established, the communications apparatus starts to operate in the EMM-connected mode or enters the EMM-connected state. Generally, the modem 120/220 has the knowledge of whether the communications apparatus is in the EMM-connected mode (EMM-connected state) by checking the communications status thereof. For a UE in the ECM-CONNECTED state, there exists a signaling connection between the UE and the MME, where the ECM-CONNECTED and ECM-IDLE states correspond respectively to the EMM-CONNECTED and EMM-IDLE modes as defined in TS 24.301. Regarding definition of the EMM-connected state, reference may be made to 3GPP TS 23.401, chapter 4.6 and 3GPP TS 24.301.

According to another embodiment of the invention, the connected mode (connected state) is the 5GMM-connected mode (5G MM-connected state). Generally, a UE is in a 5GMM-CONNECTED mode over non-3GPP access when an Ni NAS signaling connection between the UE and network over non-3GPP access exists. The term 5GMM-CONNECTED mode over non-3GPP access used in the present document corresponds to the term CMCONNECTED state for non-3GPP access used in 3GPP TS 23.501 [8]. Regarding definition of the 5GMM-connected state, reference may be made to 3GPP TS 124 501.

Figure 4B:
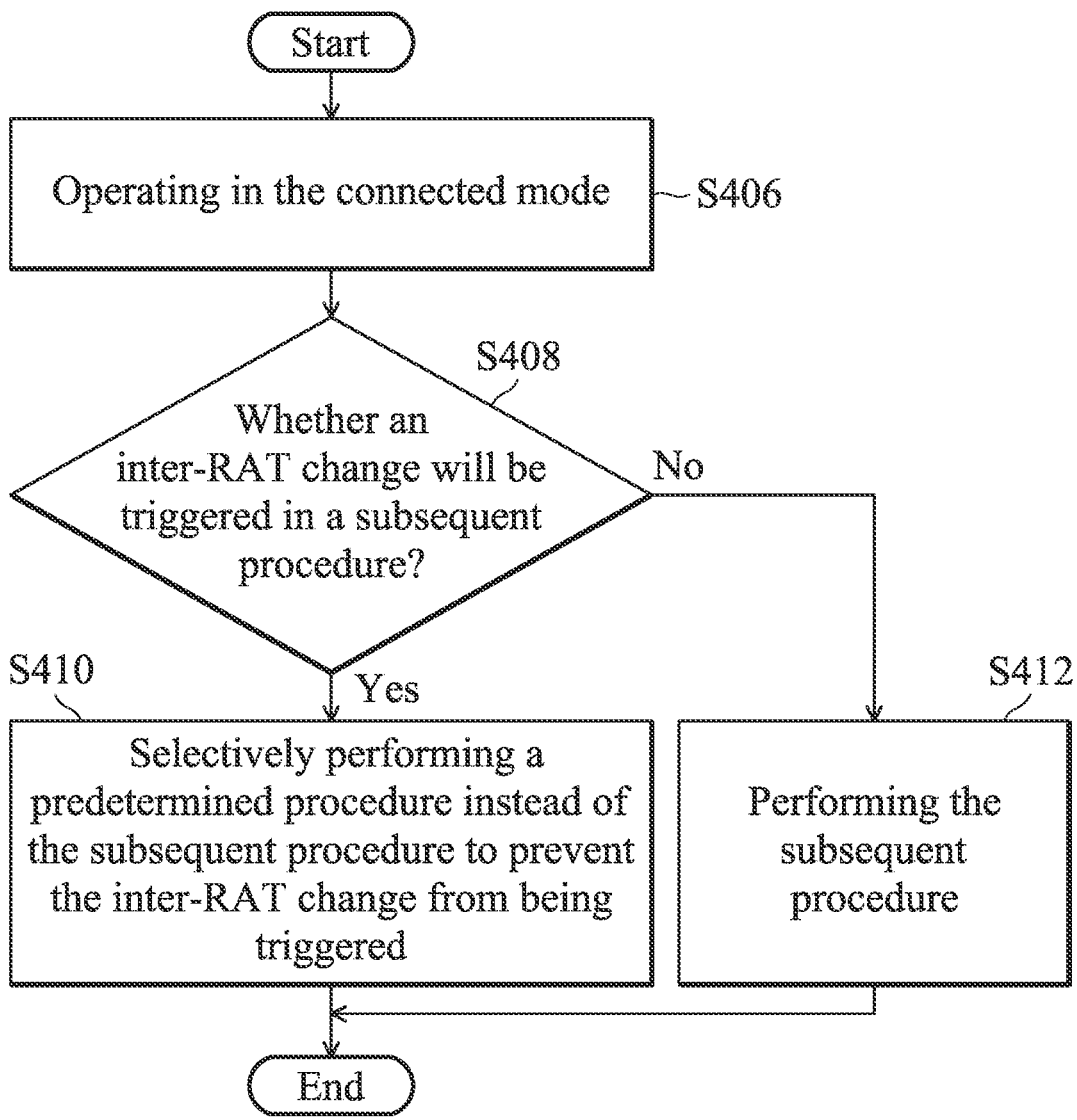
FIG. 4B is a flow chart of a method for preventing an inter-RAT change from being triggered when a communications apparatus is in a connected mode according to another embodiment of the invention.

FIG. 4B is a flow chart of a method for preventing an inter-RAT change from being triggered when a communications apparatus is in a connected mode according to another embodiment of the invention. The method may begin for the processor (e.g. the processor 222 in the modem 120/220 or the application processor 130) of the communications apparatus (e.g. the communications apparatus 100, 301 or 308) to determine whether the communications apparatus operates in the connected mode or in the connected state. In the embodiments of the invention, the connected mode (connected state) may be the EMM connected mode (EMM connected state) or the 5GMM-connected mode (5GMM-connected state) as discussed above. When the processor determines that the communications apparatus is in the connected mode (connected state) (Step S406), the processor may further determine whether an inter-RAT change will be triggered in a subsequent procedure (Step S408). In the embodiments of the invention, the processor may perform step S408 at the time when the communications apparatus enters the connected state, or may perform the step S408 at the time when detecting that a subsequent procedure that will trigger an inter-RAT change will possibly occur. When it is determined that an inter-RAT change procedure will be triggered or may possibly be triggered in the subsequent procedure, the processor may selectively perform a predetermined procedure instead of the subsequent procedure to prevent the inter-RAT change from being triggered (Step S410). When it is determined that an inter-RAT change procedure will not be triggered in the subsequent procedure, the processor may determine to perform the subsequent procedure (Step S412).

In the embodiments of the invention, for different circumstances or for different subsequent procedures that will possibly be triggered, the predetermined procedure performed by the processor may be different.

In a first aspect of the invention, when the communications apparatus is in the EMM-connected mode (EMM-connected state) and receives an incoming CS service request from a network device in the cellular network, the processor may know that a subsequent procedure, such as a Circuit Switch Fall Back (CSFB) procedure, will be triggered if the communications apparatus accepts the incoming CS service request. When the CSFB procedure is triggered, the network device, such as the MIME, will send a handover command to the communications apparatus. In response to the handover command, the communications apparatus has to trigger a handover procedure, which is an inter-RAT change procedure when being involved in the CSFB procedure, so that the communications apparatus will be redirected/released from LTE network to legacy 2G/3G network to take the CS service (such as make a voice call).

Therefore, in the first aspect of the invention, in order to prevent the inter-RAT change from being triggered, when the communications apparatus is in the EMM-connected mode (EMM-connected state) and receives an incoming CS service request from a network device in the cellular network, the processor may transmit a message to reject the incoming CS service request message, or just ignore the incoming CS service request message without transmitting any response message to the network device.

Figure 5A:
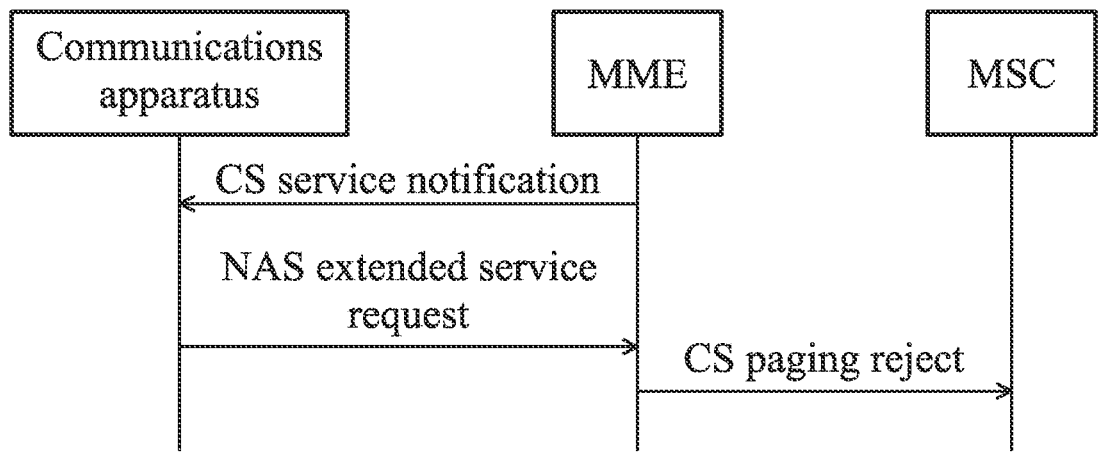
FIG. 5A shows an exemplary message flow for rejecting the incoming CS service request according to a first embodiment in the first aspect of the invention.

FIG. 5A shows an exemplary message flow for rejecting the incoming CS service request according to a first embodiment in the first aspect of the invention. In this embodiment, upon receiving a CS service notification message, such as a paging message, from the MME, the processor of the communications apparatus may reply a NAS extended service request in which the CSFB response field is set to 0, so as to reject the CS service request. Upon receiving the NAS extended service request with the CSFB response field set to 0, the MME will further transmit a CS paging reject notification message to the Mobile Switching Center (MSC) to inform the rejection of the CS service request. In this manner, the CSFB procedure will not be triggered and will not be performed, and the inter-RAT change procedure will not be triggered and performed as well. Regarding the details of the Mobile Terminating call in Active Mode, reference may be made to 3GPP TS 23.272, Sec. 7.3.

Figure 5B:
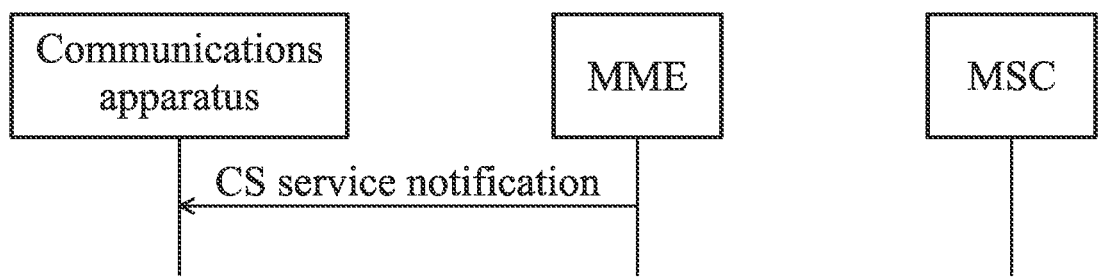
FIG. 5B shows another exemplary message flow for ignoring the incoming CS service request according to a second embodiment in the first aspect of the invention.

FIG. 5B shows another exemplary message flow for ignoring the incoming CS service request according to a second embodiment in the first aspect of the invention. In this embodiment, upon receiving a CS service notification message from the MME, the processor of the communications apparatus may just ignore this message without transmitting any response message to the MME. In this manner, the CSFB procedure will not be triggered and will not be performed, and the inter-RAT change procedure will not be triggered and performed as well.

In the embodiments of the invention, the processor that determines to reject or ignore the CS service request may be the processor 222 of the modem 120/220 or the application processor 130. In addition, determination of the rejection or ignoring may be made by request (that is, the determination is independently made for each request), made by application (for example, the determination made for each request is dependent on the application program currently being executed by the user) or made by default (that is, as long as the CS service request is received when the communications apparatus is in the EMM-connected mode, the CS service request will always be rejected or ignored).

To be more specific, when it is designed to make the determination by request, a pop-up message may be shown on the display screen of the communications apparatus when a CS service request is received in the EMM-connected mode. The pop-up message may facilitate the user to determine whether to accept the CS service request. If the user determines that answering this CS service request is more important than others, the user may determine to accept this CS service request. If the user currently does not want to be disturbed, the user may determine not to accept this CS service request. When the user determines not to accept this CS service request, the processor may reject or ignore the CS service request as discussed above. An exemplary implementation is that the processor 222 of the modem 120/220 may notify the application processor 130 that a CS service request is received in the EMM-connected mode, and the application processor 130 may pop up a message to query the user.

When it is designed to make the determination by application, a user option may be provided for the user to determine which application program shall not be disturbed, such as disturbed by any other application or incoming CS service request. For example, the user may set a status to no-disturbance for his/her favorite application program, such as an on-line game. In this manner, when a CS service request is received in the EMM-connected mode during the period when the application program is activated, the processor will reject or ignore the CS service request as discussed above without further notifying the user. An exemplary implementation is that the processor 222 of the modem 120/220 may notify the application processor 130 that a CS service request is received in the EMM-connected mode, and the application processor 130 may determine which application program is currently activated and whether to reject or ignore the CS service request based on the user option or user's preference of the corresponding application program. Another exemplary implementation is that the application processor 130 may send a command to the processor 222 of the modem 120/220 to notify that the user would not like to be disturbed during the period when the application program is activated. In this manner, when a CS service request is received in the EMM-connected mode during this period, the processor 222 of the modem 120/220 may determine to reject or ignore the CS service request.

When it is designed to make the determination by default, a user option may be provided for the user to determine whether to reject all incoming CS service request in some condition or during some preset period of time. When the condition is met or in the preset period of time, the processor will reject or ignore the CS service request as discussed above without further notifying the user. An exemplary implementation is that the processor 222 of the modem 120/220 may notify the application processor 130 that a CS service request is received in the EMM-connected mode, and the application processor 130 may determine whether the preset condition is met or whether it is now in the preset period of time. If so, the application processor 130 may notify the processor 222 of the modem 120/220 to reject or ignore the CS service request. Another exemplary implementation is that the application processor 130 may send a command to the processor 222 of the modem 120/220 to notify that preset condition is met or now it is in the preset period of time to reject all incoming CS service request. In this manner, when a CS service request is received in the EMM-connected mode during this period, the processor 222 of the modem 120/220 may determine to reject or ignore the CS service request.

Regarding a second aspect of the invention, when the communications apparatus is in the EMM-connected mode (EMM-connected state), the processor may know that a subsequent procedure, such as a single radio voice call continuity (SRVCC) procedure, may have the chance to be triggered when a cellular packet switch (PS) call, such as a voice over LTE (VoLTE) call, has been established but the signal quality of this cellular PS call is poor (for example, degrades to a certain level). When the SRVCC procedure is triggered, the network device, such as the MME, will send a handover command to the communications apparatus. The handover procedure is an inter-RAT change procedure when being involved in the SRVCC procedure, so that the communications apparatus will be redirected/released from LTE network to legacy 2G/3G network to maintain the voice call.

Figure 6:
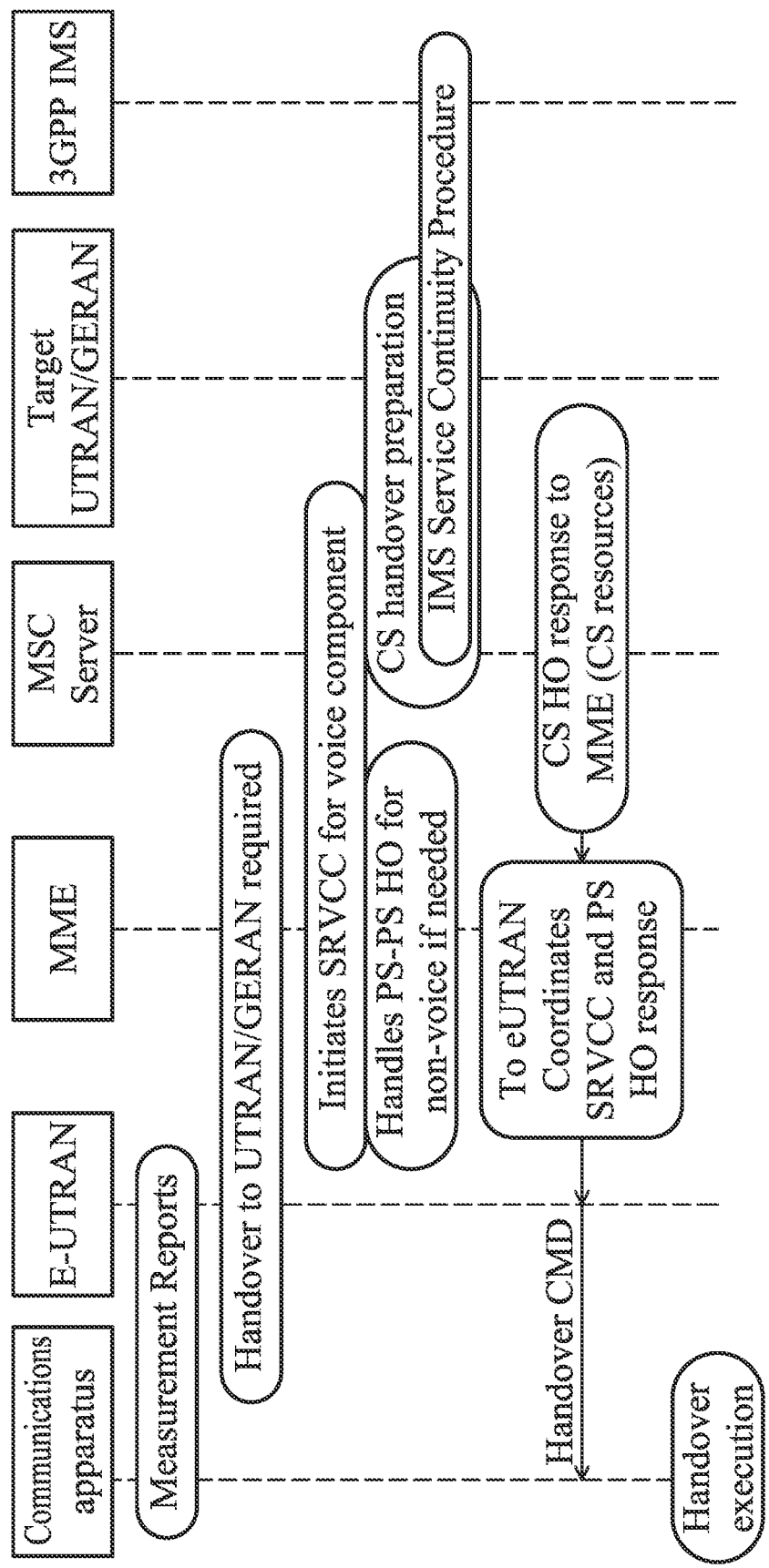
FIG. 6 is a conventional message flow for SRVCC from E-UTRAN to UTRAN or GERAN.

FIG. 6 is a conventional message flow of making the SRVCC from Evolved Universal Terrestrial Radio Access Network (E-UTRAN) to UMTS Terrestrial Radio Access Network (UTRAN) or GSM EDGE Radio Access Network (GERAN). Regarding detailed descriptions of FIG. 6, reference may be made to 3GPP TS 23.216, FIG. 4.2.2-1. As shown in FIG. 6, in the conventional design, the last step is to execute handover by the UE in response to the handover command received from the MME. Therefore, performing handover is the UE's behavior as defined by the 3GPP standards.

However, as discussed above, performance of the handover procedure will cause the communications apparatus to leave the LTE network and then disconnection will occur. Therefore, in the second aspect of the invention, in order to prevent the inter-RAT change from being triggered, when the communications apparatus is in the EMM-connected mode (EMM-connected state), or, when a cellular packet switch (PS) call, such as a voice over LTE (VoLTE) call, has been established at the time when the communications apparatus is in the EMM-connected mode (EMM-connected state), the processor may selectively perform a parameter update procedure to inform the cellular network that the SRVCC service is not supported, or selectively perform an RRC connection re-establishment procedure instead of a handover procedure in response to a handover command received from the network device, so as to re-establish the RRC connection with the 4G/LTE cellular network.

According to a first embodiment in the second aspect of the invention, the application processor 130 may send a command with the CISRVCC parameter set to 0, so as to instruct the processor 222 of the modem 120/220 to selectively perform a parameter update procedure to update the capability of the modem. By setting the CISRVCC parameter to 0, the cellular network will be informed that the SRVCC service is not supported by the communications apparatus. In this manner, the network device will not trigger the SRVCC, even if the signal quality of the cellular PS call degrades to a certain level. Regarding details of the command to set the parameter CISRVCC, reference may be made to 3GPP TS 27.007 sub clause 8.63.

In the embodiments of the invention, determination of whether to disable the SRVCC service may be made by call (for example, the determination is independently made for each cellular PS call), by application (for example, depending on the application program currently being executed by the user) or made by default (that is, as long as the communications apparatus is in the EMM-connected mode, the modem 120/220 will be inform the cellular network that the SRVCC service is not supported).

To be more specific, when it is designed to make the determination by call, a pop-up message may be shown on the display screen of the communications apparatus when a cellular PS call is established. The pop-up message may facilitate the user to determine whether to disable the SRVCC service for this cellular PS call. If the user determines that to keep this PS call is more important than others, the user may determine to not to disable the SRVCC service. If the user currently does not want to be redirected to the legacy network, the user may determine to disable the SRVCC service. When the user determines to disable the SRVCC service, the modem 120/220 will inform the cellular network that the SRVCC service is not supported as discussed above. An exemplary implementation is that the application processor 130 may send the command to the processor 222 of the modem 120/220 to set the CISRVCC parameter based on the selection of the user.

When it is designed to make the determination by the application, a user option may be provided for the user to determine which application program shall not be disturbed or affected by the SRVCC service. For example, the user may set a status to no-disturbance for his/her favorite application program, such as an on-line game. In this manner, the SRVCC service shall be disabled when the no-disturbance application program is activated. An exemplary implementation is that when the application processor 130 detects that the no-disturbance application program is activated, the application processor 130 sends a command with the CISRVCC parameter set to 0 to the processor 222 of the modem 120/220, so as to instruct the processor 222 to selectively perform a parameter update procedure as discussed above.

When it is designed to make the determination by default, a user option may be provided for the user to determine whether to disable the SRVCC service in some condition or during some preset period of time, such as every time when the communications apparatus enters the EMM-connected state. When the condition is met or in the preset period of time, the processor will disable the SRVCC service as discussed above without further notifying the user. An exemplary implementation is that when the application processor 130 detects that the condition is met or it is now in the preset period of time, the application processor 130 may send a command with the CISRVCC parameter set to 0 to the processor 222 of the modem 120/220, so as to instruct the processor 222 to selectively perform a parameter update procedure as discussed above.

According to a second embodiment in the second aspect of the invention, when a cellular packet switch (PS) call, such as a voice over LTE (VoLTE) call, has been established at the time when the communications apparatus is in the EMM-connected mode (EMM-connected state), the processor may selectively perform an RRC connection re-establishment procedure, instead of a handover procedure, in response to a handover command received from the network device, so as to re-establish the RRC connection with the 4G/LTE cellular network.

Figure 7A:
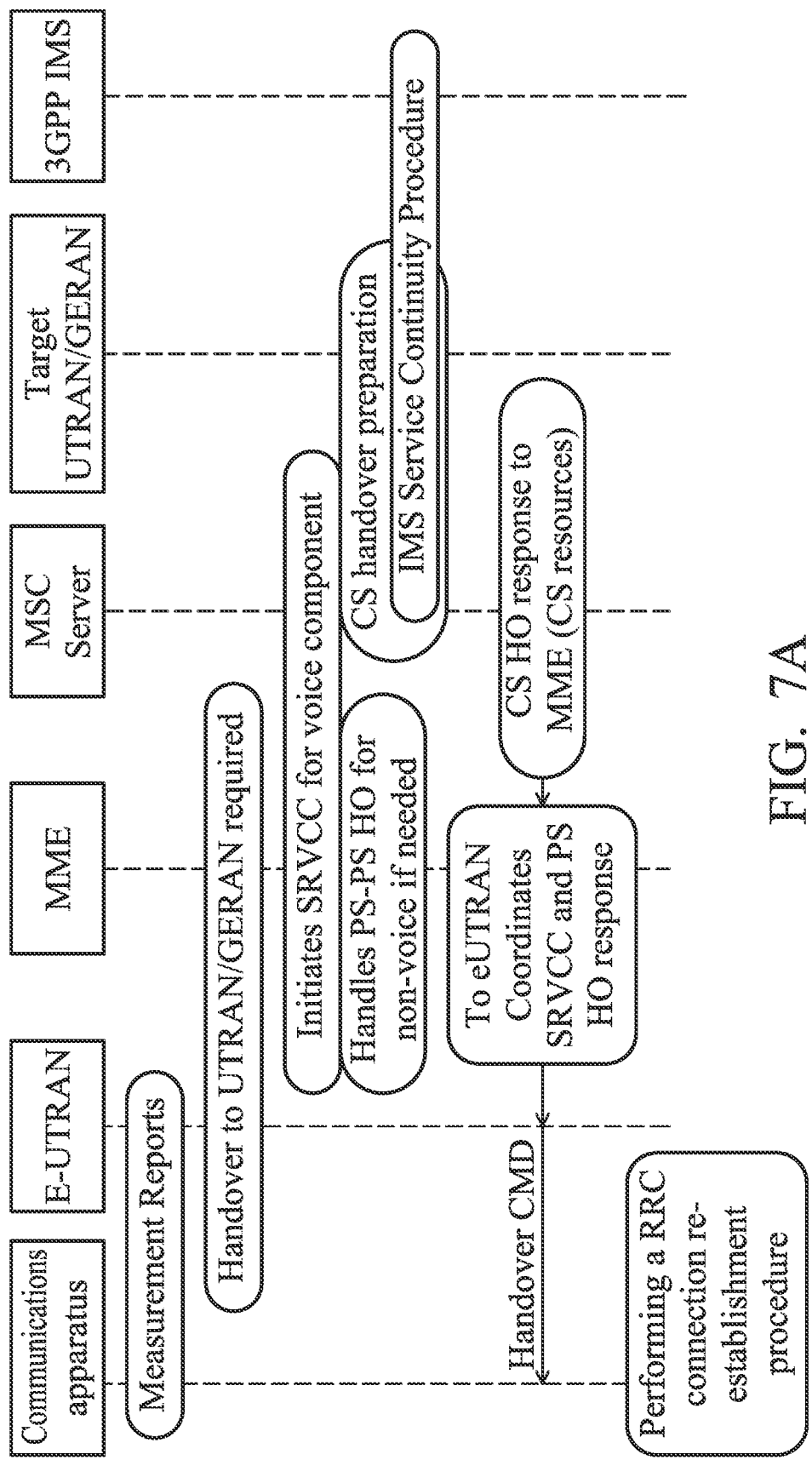
FIG. 7A shows an exemplary message flow according to a second embodiment in the second aspect of the invention.
Figure 7B:
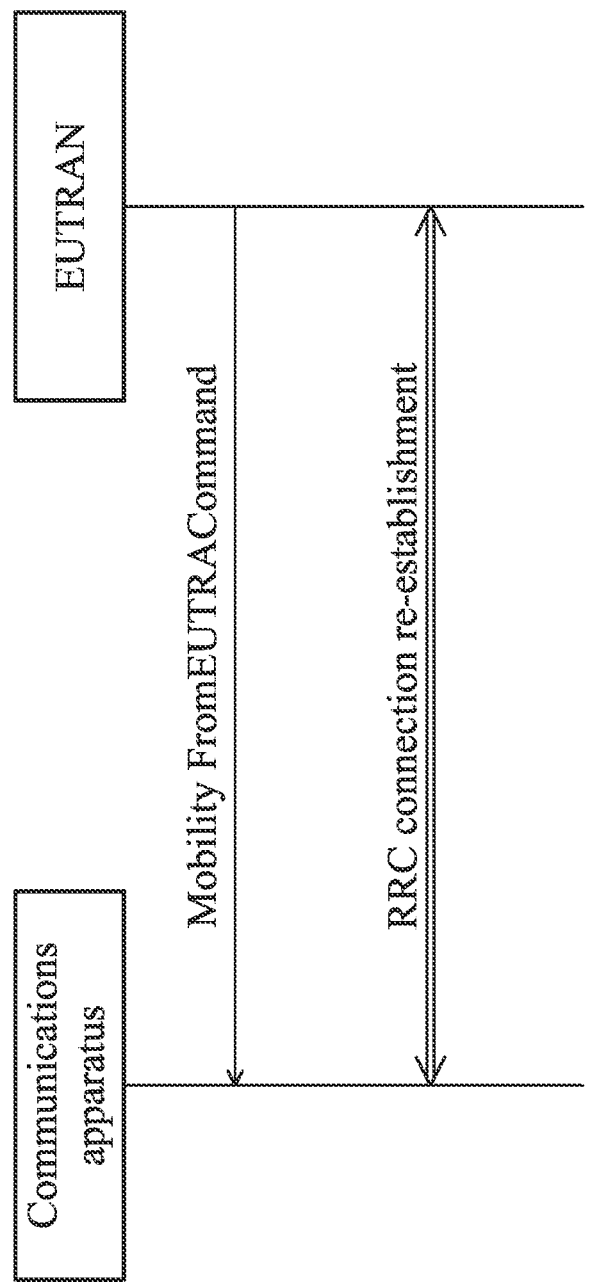
FIG. 7B shows an exemplary message flow for triggering an RRC connection re-establishment.

FIG. 7A shows an exemplary message flow according to a second embodiment in the second aspect of the invention. Different from the conventional message flow defined by the 3GPP standards as shown in FIG. 6, in the second embodiment in the second aspect of the invention, the communications apparatus (e.g. the UE) selectively performs an RRC connection re-establishment procedure instead of a handover procedure in response to the handover command received from the MME. Regarding details of the RRC connection re-establishment, reference may be made to 3GPP TS 36.331 and TS 23.216. It should be understood that performing an RRC connection re-establishment procedure instead of a handover procedure is an allowable behavior for the cellular network since the handover command is one of the set of commands MobilityFromEUTRACommand that can trigger an RRC connection re-establishment procedure, as shown in FIG. 7B (reference may be made to 3GPP TS 36.331 FIG. 5.4.3.1-2).

Through the RRC connection re-establishment procedure, the communications apparatus re-establishes the RRC connection with the 4G/LTE cellular network, thereby handover will not be triggered and will not be performed, and the inter-RAT change procedure will not be triggered and performed as well.

In the embodiments of the invention, the processor that determines to perform the RRC connection re-establishment procedure may be the processor 222 of the modem 120/220 or the application processor 130. In addition, determination of selectively performing the RRC connection re-establishment procedure may be made by request (that is, the determination is independently made for each SRVCC handover request), made by application (for example, the determination made for each SRVCC handover request is dependent on the application program currently being executed by the user) or made by default (that is, as long as the SRVCC handover request is received when the communications apparatus is in the EMM-connected mode, the RRC connection re-establishment procedure will always be performed).

To be more specific, when it is designed to make the determination by the request, a pop-up message may be shown on the display screen of the communications apparatus when a SRVCC handover request is received. The pop-up message may facilitate the user to determine whether to reject the SRVCC handover request. If the user determines that to keep this PS call is more important than others, the user may determine to not to reject the SRVCC handover request. If the user currently does not want to be redirected to the legacy network, the user may determine to reject the SRVCC handover request. When the user determines to reject the SRVCC handover request, the modem 120/220 triggers an RRC connection re-establishment procedure as discussed above. An exemplary implementation is that the application processor 130 may send a command to the processor 222 of the modem 120/220 based on the selection of the user to instruct the processor 222 whether to trigger a handover procedure or an RRC connection re-establishment in response to the SRVCC handover request.

When it is designed to make the determination by application, a user option may be provided for the user to determine which application program shall not be disturbed or affected by the SRVCC service. For example, the user may set a status to no-disturbance for his/her favorite application program, such as an on-line game. In this manner, the SRVCC handover request shall be rejected when the no-disturbance application program is activated. An exemplary implementation is that processor 222 of the modem 120/220 may notify the application processor 130 that a SRVCC handover request is received in the EMM-connected mode, and the application processor 130 may determine which application program is currently activated and whether to reject the SRVCC handover request based on the user option or user's preference of the corresponding application program. Another exemplary implementation is that the application processor 130 may send a command to the processor 222 of the modem 120/220 to notify that the user would not like to be disturbed during the period when the application program is activated. In this manner, when a SRVCC handover request is received in the EMM-connected mode during this period, the processor 222 of the modem 120/220 may determine to perform the RRC connection re-establishment in response to the SRVCC handover request as discussed above.

When it is designed to make the determination by default, a user option may be provided for the user to determine whether to reject the SRVCC handover request in some condition or during some preset period of time. When the SRVCC handover request is received at the time when the condition is met or in the preset period of time, the processor will reject the SRVCC handover request as discussed above without further notifying the user. An exemplary implementation is that when detecting that the condition is met or it is now in the preset period of time, the processor 222 of the modem 120/220 may determine to perform the RRC connection re-establishment in response to the SRVCC handover request as discussed above.

In a third aspect of the invention, in order to prevent the inter-RAT change from being triggered, when the communications apparatus is in the EMM-connected mode (EMM-connected state), the processor may selectively perform a de-register procedure to de-register from a cellular network. The reason to perform a de-register procedure is to prevent a subsequent procedure, which has a chance to trigger an inter-RAT change procedure, from occurring. In the third aspect of the invention, the subsequent procedure may be, for example, a periodic or aperiodic re-register procedure to re-register to the cellular network, an incoming call or SMS processing procedure for processing an incoming CS service request, or others.

Referring to FIG. 3B, when the communications apparatus is in the cellular communications system 300B, the communications apparatus usually registers to both the LTE network and the CDMA 2000 network. When the communications apparatus is in the EMM-connected mode (EMM-connected state), the communications apparatus may still monitor the CDMA 2000 network for not missing any incoming voice call or SMS message. In addition, the communications apparatus may also use some gap period to perform the periodic or aperiodic re-register procedure. However, performing the periodic or aperiodic re-register procedure to re-register to the CDMA 2000 network or processing an incoming CS service request will cause the communications apparatus to temporarily leave the LTE network (e.g. suspending the LTE's service) so as to connect to the CDMA 2000 network (for more details, reference may be made to CDMA 2000 standards C.S0005), which is also an inter-RAT change procedure. The inter-RAT change procedure is especially undesirable when the communications apparatus supports single radio LTE (SRLTE) and is in the EMM-connected mode (EMM-connected state) since the RRC connection will be disconnected. Therefore, in the third aspect of the invention, in order to prevent the inter-RAT change from being triggered, when the communications apparatus is in the EMM-connected mode (EMM-connected state), the processor may perform a de-register procedure to de-register from the CDMA 2000 network.

Figure 8:
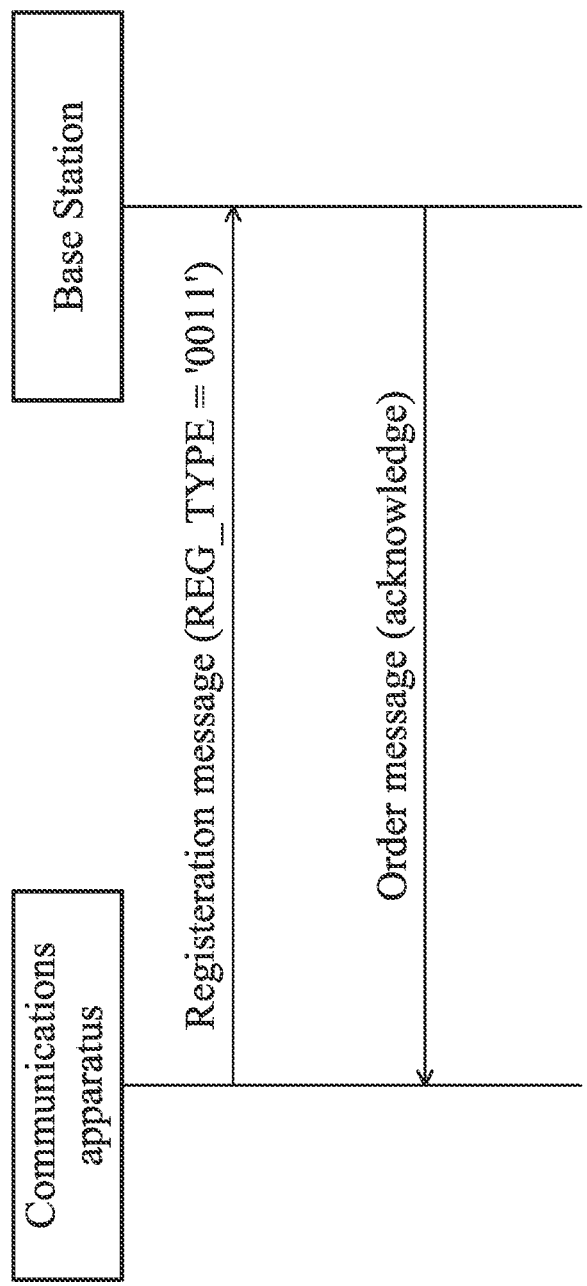
FIG. 8 shows an exemplary message flow according to an embodiment in the third aspect of the invention.

FIG. 8 shows an exemplary message flow according to an embodiment in the third aspect of the invention. According to the embodiments in the third aspect of the invention, the communications apparatus is configured to transmit a registration message in which the REG_TYPE field is set to '0011', so as to de-register (or, un-register) from the CDMA 2000 network. The registration type code '0011' means "power down" (for more details, reference may be made to CDMA 2000 standards C.S0005 table 2.7.1.3.2.1-1). Upon receiving the registration message, the base station replies an order message (acknowledge) to inform the communications apparatus that de-registration is successful. In this manner, the CDMA 2000 network will not provide service for the communications apparatus, and thereby the inter-RAT change will not be triggered during the period of time when the communications apparatus is de-registered from the network.

In the embodiments of the invention, determination of whether to de-register from the cellular network may be made by application (for example, depending on the application program currently being executed by the user) or made by default (that is, as long as the communications apparatus is in the EMM-connected mode, the modem 120/220 will perform the de-register procedure).

To be more specific, when it is designed to make the determination by the application, a user option may be provided for the user to determine which application program shall not be disturbed or affected by the communications service provided by a specific RAT, such as the CDMA 2000 as discussed above. For example, the user may set a status to no-disturbance for his/her favorite application program, such as an on-line game. In this manner, the de-register procedure shall be performed when the no-disturbance application program is activated. An exemplary implementation is that when the application processor 130 detects that the no-disturbance application program is activated, the application processor 130 sends a command to the processor 222 of the modem 120/220, so as to instruct the processor 222 to perform the de-register procedure as discussed above to de-register from the corresponding cellular network.

When it is designed to make the determination by default, a user option may be provided for the user to determine whether to de-register from the specific cellular network in some condition or during some preset period of time, such as every time when the communications apparatus enters the EMM-connected state. When the condition is met or in the preset period of time, the processor will perform the de-register procedure as discussed above without further notifying the user. An exemplary implementation is that when the application processor 130 detects that the condition is met or it is now in the preset period of time, the application processor 130 may send a command to the processor 222 of the modem 120/220, so as to instruct the processor 222 to perform the de-register procedure as discussed above to de-register from the corresponding cellular network.

In a fourth aspect of the invention, in order to prevent the inter-RAT change from being triggered, when the communications apparatus, which is capable of providing 5G NR services and communicating with a 5G core network, is in the 5GMM-connected mode (5GMM-connected state) and receives an incoming call notification message from a network device in the cellular network, the processor may reject the incoming call notification message. For example, one way for the processor to reject the incoming call notification message is that the processor may just ignore the incoming call notification message without transmitting any response message to the network device.

Generally, when the communications apparatus is connected to a 5G stand-alone (SA) network and communicating with a network device providing communications services in the 5G SA network, and either the communications apparatus or the network device in the 5G SA network cannot support voice over new radio (VoNR), the inter-RAT change will be triggered when the communications apparatus receives an incoming call notification message in the 5GMM-connected mode (5GMM-connected state) and determines to accept the incoming call.

To be more specific, when the communications apparatus is in the 5GMM-connected mode (5GMM-connected state) and receives an incoming call notification message, such as a Session Initiation Protocol (SIP) invite message for an IMS call, the processor may know that a subsequent procedure, such as a EPS Fall Back (EPS FB) procedure, will be triggered if the communications apparatus accepts the incoming call request, since the VoNR in the 5G network cannot be established between the communications apparatus and the network device). When the EPS FB procedure is triggered, the communications apparatus will be redirected/released from 5G network to legacy LTE network to take the incoming call (such as make a voice call).

Therefore, in the fourth aspect of the invention, in order to prevent the inter-RAT change from being triggered, when the communications apparatus is in the 5GMM-connected mode (5GMM-connected state) and receives an incoming call notification message from a network device in the cellular network, the processor may reject the incoming call notification message by just ignoring the incoming call notification message without transmitting any response message to the network device when determining that the VoNR cannot be carried out, so as to avoid triggering the EPS FB procedure.

According to an embodiment of the invention, the processor may just do nothing for this incoming call notification message and wait until timeout (e.g. wait until a predetermined timer set for handling this incoming call notification message as specified by the corresponding specifications expires). When the predetermined timer expires, the network device may regard this incoming call request as being rejected and will not perform any further procedure for establishing this call.

Figure 9:
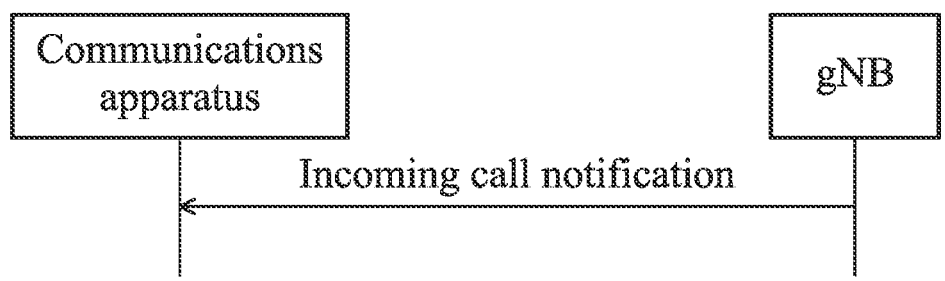
FIG. 9 shows an exemplary message flow for ignoring the incoming call notification message according to an embodiment in the fourth aspect of the invention.

FIG. 9 shows an exemplary message flow for ignoring the incoming call notification message according to an embodiment in the fourth aspect of the invention. In this embodiment, upon receiving an incoming call notification message, such as a SIP invite message for an IMS call, from the gNB, the processor of the communications apparatus may just ignore this message without transmitting any response message to the gNB. In this manner, the EPS FB procedure will not be triggered and will not be performed, and the inter-RAT change procedure will not be triggered and performed as well.

In the embodiments of the invention, the processor that determines to ignore the incoming call notification message may be the processor 222 of the modem 120/220 or the application processor 130. In addition, determination of the ignoring may be made by request (that is, the determination is independently made for each request), made by application (for example, the determination made for each request is dependent on the application program currently being executed by the user) or made by default (that is, as long as the incoming call notification message is received when the communications apparatus connecting to the 5G SA network is in the 5GMM-connected mode, the incoming call notification message will always be ignored).

To be more specific, when it is designed to make the determination by request, a pop-up message may be shown on the display screen of the communications apparatus when an incoming call notification message is received in the 5GMM-connected mode. The pop-up message may facilitate the user to determine whether to accept the incoming call. If the user determines that answering this incoming call is more important than others, the user may determine to accept this incoming call. If the user currently does not want to be disturbed, the user may determine not to accept this incoming call. When the user determines not to accept this incoming call, the processor may reject or ignore the incoming call as discussed above. An exemplary implementation is that the processor 222 of the modem 120/220 may notify the application processor 130 that an incoming call notification is received in the 5GMM-connected mode, and the application processor 130 may pop up a message to query the user.

When it is designed to make the determination by application, a user option may be provided for the user to determine which application program shall not be disturbed, such as disturbed by any other application or incoming call request. For example, the user may set a status to no-disturbance for his/her favorite application program, such as an on-line game. In this manner, when an incoming call notification is received in the 5GMM-connected mode during the period when the application program is activated, the processor will reject or ignore the incoming call notification as discussed above without further notifying the user. An exemplary implementation is that the processor 222 of the modem 120/220 may notify the application processor 130 that an incoming call notification is received in the 5GMM-connected mode, and the application processor 130 may determine which application program is currently activated and whether to reject or ignore the incoming call notification based on the user option or user's preference of the corresponding application program. Another exemplary implementation is that the application processor 130 may send a command to the processor 222 of the modem 120/220 to notify that the user would not like to be disturbed during the period when the application program is activated. In this manner, when an incoming call notification is received in the 5GMM-connected mode during this period, the processor 222 of the modem 120/220 may determine to reject or ignore the incoming call.

When it is designed to make the determination by default, a user option may be provided for the user to determine whether to reject all incoming call in some condition or during some preset period of time. When the condition is met or in the preset period of time, the processor will reject or ignore the incoming call as discussed above without further notifying the user. An exemplary implementation is that the processor 222 of the modem 120/220 may notify the application processor 130 that an incoming call notification is received in the 5GMM-connected mode, and the application processor 130 may determine whether the preset condition is met or whether it is now in the preset period of time. If so, the application processor 130 may notify the processor 222 of the modem 120/220 to reject or ignore the incoming call. Another exemplary implementation is that the application processor 130 may send a command to the processor 222 of the modem 120/220 to notify that preset condition is met or now it is in the preset period of time to reject all incoming call. In this manner, when an incoming call notification is received in the 5GMM-connected mode during this period, the processor 222 of the modem 120/220 may determine to reject or ignore the incoming call notification.

Via the embodiments as discuss above, when the communications apparatus is in a connected mode or when the processor determines that an inter-RAT change procedure will be triggered in the connected mode, a predetermined procedure will be selectively performed to prevent an inter-RAT change from being triggered. In this manner, unwanted disconnection will not occur, and the user experience can be greatly improved.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
   a radio transceiver, capable of transmitting or receiving wireless radio frequency signals to or from a cellular network; and
   a processor, configured to:
      receive an incoming call request message that will trigger a Circuit Switch Fall Back (CSFB) procedure or a Evolved Packet System Fall Back (EPS FB) procedure from the cellular network via the radio transceiver;
      query a user to accept or reject the incoming call request before triggering the CSFB procedure or the EPS FB procedure, and
      determine whether to trigger the CSFB procedure or the EPS FB procedure based on a response to the query from the user.

2. The communications apparatus as claimed in claim 1, wherein the determining of whether to trigger the CSFB procedure or the EPS FB procedure based on the response to the query from the user comprises:
   dropping triggering the CSFB procedure or the EPS FB procedure based on the response indicating that the user rejects the incoming call request.

3. The communications apparatus as claimed in claim 2, wherein the processor is further configured to:
   reject the incoming call request by transmitting a message to the cellular network to indicate that the incoming call request is rejected based on the response indicating that the user rejects the incoming call request.

4. The communications apparatus as claimed in claim 3, wherein the incoming call request is received when the communications apparatus is in an EPS Mobility Management (EMM)-connected mode, and the message is a NAS extended service request comprising a CSFB response field that is set to 0.

5. The communications apparatus as claimed in claim 2, wherein the processor is further configured to:
   reject the incoming call request by ignoring the incoming call request based on the response indicating that the user rejects the incoming call request.

6. The communications apparatus as claimed in claim 5, wherein the ignoring of the incoming call request is performed by preventing the communications apparatus from transmitting any response message for the incoming call request to the cellular network.

7. The communications apparatus as claimed in claim 1, wherein the incoming call request is a Session Initiation Protocol (SIP) invite message for an IMS call, which is received when the communications apparatus is in a 5G Mobility Management (MM)-connected mode.

8. A method, comprising:
   receiving, by a communications apparatus, an incoming call request message that will trigger a CSFB procedure or an EPS FB procedure from a cellular network;
   querying, by the communications apparatus, a user to accept or reject the incoming call request before triggering the CSFB procedure or the EPS FB procedure; and
   determining, by the communications apparatus, whether to trigger the CSFB procedure or the EPS FB procedure based on a response to the query from the user.

9. The method as claimed in claim 8, wherein the determining of whether to trigger the CSFB procedure or the EPS FB procedure based on the response to the query from the user comprises:
   dropping triggering the CSFB procedure or the EPS FB procedure based on the response indicating that the user rejects the incoming call request.

10. The method as claimed in claim 9, further comprising:
    rejecting, by the communications apparatus, the incoming call request by transmitting a message to the cellular network to indicate that the incoming call request is rejected based on the response indicating that the user rejects the incoming call request.

11. The method as claimed in claim 10, wherein the incoming call request is received when the communications apparatus is in an EMM-connected mode, and the message is a NAS extended service request comprising a CSFB response field that is set to 0.

12. The method as claimed in claim 9, further comprising:

rejecting, by the communications apparatus, the incoming call request by ignoring the incoming call request based on the response indicating that the user rejects the incoming call request.

13. The method as claimed in claim 12, wherein the ignoring of the incoming call request is performed by preventing the communications apparatus from transmitting any response message for the incoming call request to the cellular network.

14. The method as claimed in claim 8, wherein the incoming call request is a SIP invite message for an IMS call, which is received when the communications apparatus is in a 5G MM-connected mode.

15. A method, comprising:

receiving, by a communications apparatus, an incoming CS service request that will trigger a CSFB procedure from a cellular network;

querying, by the communications apparatus, a user to accept or reject the incoming CS service request before triggering the CSFB procedure; and determining, by the communications apparatus, whether to trigger the CSFB procedure based on a response to the query from the user.

16. The method as claimed in claim 15, wherein the determining of whether to trigger the CSFB procedure or the EPS FB procedure based on the response to the query from the user comprises:

dropping triggering the CSFB procedure or the EPS FB procedure based on the response indicating that the user rejects the incoming CS service request.

17. The method as claimed in claim 16, further comprising:

rejecting, by the communications apparatus, the incoming CS service request by transmitting a message to the cellular network to indicate that the incoming CS service request is rejected based on the response indicating that the user rejects the incoming CS service request.

18. The method as claimed in claim 17, wherein the message is a NAS extended service request comprising a CSFB response field that is set to 0.

19. The method as claimed in claim 16, further includes:

rejecting, by the communications apparatus, the incoming CS service request by ignoring the incoming CS service request based on the response indicating that the user rejects the incoming CS service request.

20. The method as claimed in claim 15, wherein the incoming CS service request is a voice call request.

* * * * *